US011346363B2

(12) United States Patent
Foster et al.

(10) Patent No.: US 11,346,363 B2
(45) Date of Patent: May 31, 2022

(54) COMPOSITE AIRFOIL FOR GAS TURBINE

(71) Applicant: United Technologies Corporation, Farmington, CT (US)

(72) Inventors: Larry Foster, South Glastonbury, CT (US); John D. Riehl, Hebron, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 854 days.

(21) Appl. No.: 15/966,109

(22) Filed: Apr. 30, 2018

(65) Prior Publication Data

US 2019/0331127 A1    Oct. 31, 2019

(51) Int. Cl.
*F04D 29/38*    (2006.01)
*B32B 5/02*    (2006.01)
(Continued)

(52) U.S. Cl.
CPC ............ *F04D 29/388* (2013.01); *B32B 5/024* (2013.01); *B32B 27/12* (2013.01); *B32B 27/38* (2013.01); *F02K 3/06* (2013.01); *F04D 29/023* (2013.01); *F04D 29/325* (2013.01); *B29C 70/48* (2013.01); *B29K 2063/00* (2013.01); (Continued)

(58) Field of Classification Search
CPC .......... F01D 5/141; F01D 5/147; F01D 5/282; F01D 5/3007; F02K 3/06; F04D 29/023; F04D 29/325; F04D 29/388; F05D 2220/323; F05D 2230/31; B29C 70/48; B29K 2063/00; B29K 2307/04; B29L 2031/08; B32B 2255/02; B32B 2255/26; B32B 2262/106; B32B 2603/00; B32B 27/12; B32B 27/38; B32B 5/024
See application file for complete search history.

(56) References Cited

U.S. PATENT DOCUMENTS 4,480,957 A    11/1984 Patel et al.
4,643,647 A    2/1987 Perry
(Continued)

FOREIGN PATENT DOCUMENTS

EP    3018293    5/2006
EP    2327538    6/2011
(Continued)

OTHER PUBLICATIONS

European Search Report for European Patent Application No. 19172045.7 completed Sep. 17, 2019.
(Continued)

*Primary Examiner* — Kenneth Bomberg
*Assistant Examiner* — Julian B Getachew
(74) *Attorney, Agent, or Firm* — Carlson, Gaskey & Olds, P.C.

(57) ABSTRACT

An airfoil for a gas turbine engine according to an example of the present disclosure includes, among other things, an airfoil section extending between a leading edge and a trailing edge in a chordwise direction and extending between a tip and a root section in a spanwise direction. A composite core defines the root section and a portion of the airfoil section. First and second skins extend along opposed sides of the composite core. 12. A method of forming a composite airfoil is also disclosed.

20 Claims, 6 Drawing Sheets

(51) Int. Cl.
*B32B 27/12* (2006.01)
*B32B 27/38* (2006.01)
*F02K 3/06* (2006.01)
*F04D 29/02* (2006.01)
*F04D 29/32* (2006.01)
*B29C 70/48* (2006.01)
*B29K 63/00* (2006.01)
*B29K 307/04* (2006.01)
*B29L 31/08* (2006.01)

(52) U.S. Cl.
CPC ....... *B29K 2307/04* (2013.01); *B29L 2031/08* (2013.01); *B32B 2255/02* (2013.01); *B32B 2255/26* (2013.01); *B32B 2262/106* (2013.01); *B32B 2603/00* (2013.01); *F05D 2220/323* (2013.01); *F05D 2230/31* (2013.01)

(56) References Cited

U.S. PATENT DOCUMENTS

| | | | |
|---|---|---|---|
| 5,123,813 A * | 6/1992 | Przytulski | F01D 5/26 403/372 |
| 5,129,787 A | 7/1992 | Violette et al. | |
| 5,279,892 A | 1/1994 | Baldwin et al. | |
| 5,310,317 A | 5/1994 | Bailey et al. | |
| 5,340,280 A | 8/1994 | Schilling | |
| 5,431,542 A | 7/1995 | Weisse et al. | |
| 5,443,367 A | 8/1995 | Samit et al. | |
| 5,573,377 A | 11/1996 | Bond et al. | |
| 5,725,355 A | 3/1998 | Crall | |
| 5,791,879 A | 8/1998 | Fitzgerald et al. | |
| 5,839,882 A | 11/1998 | Finn et al. | |
| 5,993,162 A | 11/1999 | Weisse et al. | |
| 6,039,542 A | 3/2000 | Schilling et al. | |
| 6,244,822 B1 | 6/2001 | Sinclair et al. | |
| 6,290,466 B1 | 9/2001 | Ravenhall et al. | |
| 6,872,340 B2 | 3/2005 | Cundiff et al. | |
| 7,121,803 B2 | 10/2006 | Gautreau et al. | |
| 7,165,944 B2 | 1/2007 | Gautreau et al. | |
| 7,451,639 B2 | 11/2008 | Goldfine et al. | |
| 7,458,780 B2 | 12/2008 | Weisse et al. | |
| 7,828,526 B2 | 11/2010 | Cairo et al. | |
| 8,100,662 B2 | 1/2012 | Schreiber | |
| 8,241,003 B2 | 8/2012 | Roberge | |
| 8,573,947 B2 | 11/2013 | Klinetob et al. | |
| 9,162,750 B2 * | 10/2015 | Coupe | B64C 11/26 |
| 9,365,285 B2 * | 6/2016 | Tutaj | B64C 11/24 |
| 9,457,435 B2 | 10/2016 | Mathon et al. | |
| 9,488,059 B2 | 11/2016 | Ventura et al. | |
| 9,556,742 B2 | 1/2017 | Parkin et al. | |
| 9,845,688 B2 | 12/2017 | Thomas et al. | |
| 10,414,487 B2 * | 9/2019 | Laurenceau | B29D 99/0025 |
| 2007/0048142 A1 | 3/2007 | Dambrine et al. | |
| 2008/0181766 A1 | 7/2008 | Campbell et al. | |
| 2008/0187441 A1 | 8/2008 | Schreiber | |
| 2009/0060745 A1 | 3/2009 | Douguet et al. | |
| 2009/0090005 A1 | 4/2009 | Carper et al. | |
| 2011/0176927 A1 | 7/2011 | Alexander et al. | |
| 2013/0039774 A1 | 2/2013 | Viens et al. | |
| 2013/0064676 A1 | 3/2013 | Salisbury et al. | |
| 2013/0167555 A1 | 7/2013 | Schwarz et al. | |
| 2013/0272893 A1 * | 10/2013 | Fabre | F04D 29/324 416/226 |
| 2016/0032939 A1 | 2/2016 | Anderson et al. | |
| 2016/0076552 A1 | 3/2016 | Anderson et al. | |
| 2016/0201480 A1 | 7/2016 | Foster | |
| 2018/0045207 A1 | 2/2018 | Paquin | |

FOREIGN PATENT DOCUMENTS

| | | |
|---|---|---|
| EP | 2362066 | 8/2011 |
| EP | 2458153 | 5/2012 |
| WO | 2015034630 | 3/2015 |

OTHER PUBLICATIONS

International Search Report and Written Opinion for PCT Application No. PCT/US2014/050614 completed Nov. 19, 2014.
Extended European Search Report for European Patent Application No. 14842050.8 completed May 9, 2017.
European Search Report for European Patent Application No. 10251401.5 completed on Jan. 16, 2014.
International Preliminary Report on Patentability for PCT Application No. PCT/US2014/050614 completed Mar. 15, 2016.
Heider, D. and Gillespie, Jr., J. W. VARTM Variability and Substantiation. Center for Composite Materials. University of Delaware.
Lancaster, J.K. (1979). Accelerated wear testing of PTFE composite bearing materials. IPC Business Press. Tribology International. Apr. 1979. pp. 65-67.
Miracle, D.B. and Donaldson, S.L. (2001). ASM Handbook, vol. 21 Composite. Materials Park, OH: Asm International. pp. 355-356.
Mouritz, A.P., Bannister, M.K., Falzon, P. J., and Leong, K.H. (1999). Review of applications for advanced three-dimensional fibre textile composites. Composites: Part A vol. 30 pp. 1445-1461.
Wang, P., Legrand, X., and Soulat, D. (2017). Three-dimentional textile preform using advanced textile technologies for composite manufacturing. Retrieved from: https://www.intechopen.com/chapters/55165.

* cited by examiner

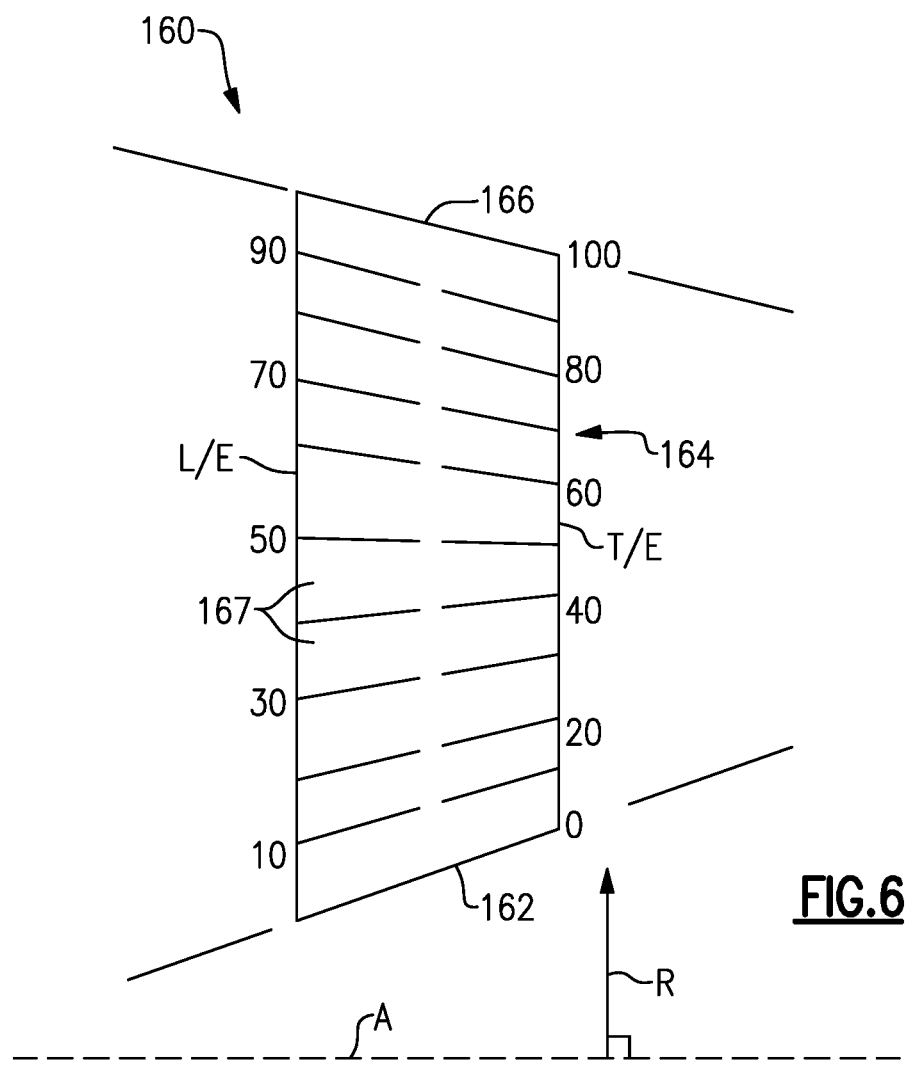

COMPOSITE AIRFOIL FOR GAS TURBINE

BACKGROUND

This disclosure relates to composite articles for a gas turbine engine, and more particularly to composite airfoils and methods of making the same.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The fan section includes an array of airfoils carried by a fan hub. Some airfoils are made of one or more layers of a composite material. During operation, the airfoils may be subjected to impact by foreign objects, such as during a bird strike event. An impact may cause the layers to delaminate, which can result in loss of structural capability and liberation of plies.

SUMMARY

An airfoil for a gas turbine engine according to an example of the present disclosure includes an airfoil section extending between a leading edge and a trailing edge in a chordwise direction and extending between a tip and a root section in a spanwise direction. The airfoil section defines a suction side and a pressure side separated in a thickness direction. A composite core defines the root section and a portion of the airfoil section such that the composite core is spaced apart from the tip, and the composite core has a three-dimensional network of woven fibers. First and second skins extend along opposed sides of the composite core for at least some span positions of the airfoil section and join together to define the tip, and each of the first and second skins is a composite skin include a two-dimensional network of fibers.

In a further embodiment of any of the foregoing embodiments, the airfoil section is free of the core for at least a majority of span positions of the airfoil section.

In a further embodiment of any of the foregoing embodiments, the three-dimensional network of woven fibers is formed from a dry fiber preform.

In a further embodiment of any of the foregoing embodiments, the composite core and the first and second skins are formed together by resin transfer molding or by resin pressure molding to define the airfoil section and the root section.

In a further embodiment of any of the foregoing embodiments, the two-dimensional network of fibers is formed from a pre-impregnated fabric or a pre-impregnated tape.

In a further embodiment of any of the foregoing embodiments, the composite core terminates in the spanwise direction along the airfoil section prior to about 25% span.

In a further embodiment of any of the foregoing embodiments, the core is skewed toward the leading edge.

A gas turbine engine according to an example of the present disclosure includes a fan section that has a fan hub that carries a plurality of fan blades. The fan hub is rotatable about an engine longitudinal axis, a compressor section, and a turbine section that drives the compressor section and the fan section. Each of the plurality of fan blades includes a root section received in a respective slot defined by the fan hub, and an airfoil section extending between a leading edge and a trailing edge in a chordwise direction and extending between a tip and the root section in a spanwise direction. The airfoil section defines a suction side and a pressure side separated in a thickness direction. A composite core defines the root section and a portion of the airfoil section such that the composite core is spaced apart from the tip. First and second skins extend along opposed sides of the composite core for at least some span positions of the airfoil section and join together to define the tip, and each of the first and second skins is a composite skin including a two-dimensional network of fibers.

In a further embodiment of any of the foregoing embodiments, the composite core includes a three-dimensional network of woven fibers formed from a dry fiber preform. The two-dimensional network of fibers is formed from a pre-impregnated fabric or a pre-impregnated tape, and the composite core and the first and second skins are formed together by resin pressure molding or by resin transfer molding to define the airfoil section and the root section.

In a further embodiment of any of the foregoing embodiments, the core terminates in the spanwise direction along the airfoil section prior to about 25% span.

In a further embodiment of any of the foregoing embodiments, the root section defines a dovetail geometry that interfaces with the respective slot, and the first and second skins extend along the dovetail geometry to space apart the core from walls of the respective slot.

A method of forming a composite airfoil for a gas turbine engine, according to an example of the present disclosure includes fabricating a core that has a three-dimensional network of woven fibers from a dry fiber preform, fabricating first and second skins each having a two-dimensional network of fibers, arranging the first and second skins relative to the core in a mold, and forming the core and the first and second skins together with resin in the mold to define a composite airfoil such that the core defines a root section of the composite airfoil and the first and second skins extend at least partially along the core to define an airfoil section of the composite airfoil.

In a further embodiment of any of the foregoing embodiments, the step of forming includes curing the core and the first and second skins in the resin subsequent to delivering the resin into the mold.

In a further embodiment of any of the foregoing embodiments, the step of forming is performed using a resin transfer molding process to define the airfoil section and the root section.

In a further embodiment of any of the foregoing embodiments, the step of fabricating the first and second skins is performed by an automated fiber placement process.

In a further embodiment of any of the foregoing embodiments, the method includes partially curing the core prior to the step of arranging.

In a further embodiment of any of the foregoing embodiments, the step of forming is performed using a resin pressure molding process to define the airfoil section and the root section.

In a further embodiment of any of the foregoing embodiments, the two-dimensional network of fibers is formed from a dry fiber tape.

In a further embodiment of any of the foregoing embodiments, the two-dimensional network of fibers is formed from a pre-impregnated fabric or pre-impregnated tape.

In a further embodiment of any of the foregoing embodiments, the airfoil section extends between a tip and the root section in a spanwise direction, and the step of arranging is performed such that the airfoil section is free of the core for at least a majority of span positions of the airfoil section.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 6 is a schematic view of sections of the airfoil of FIG. 3 at various span positions.

DETAILED DESCRIPTION

Figure 1:
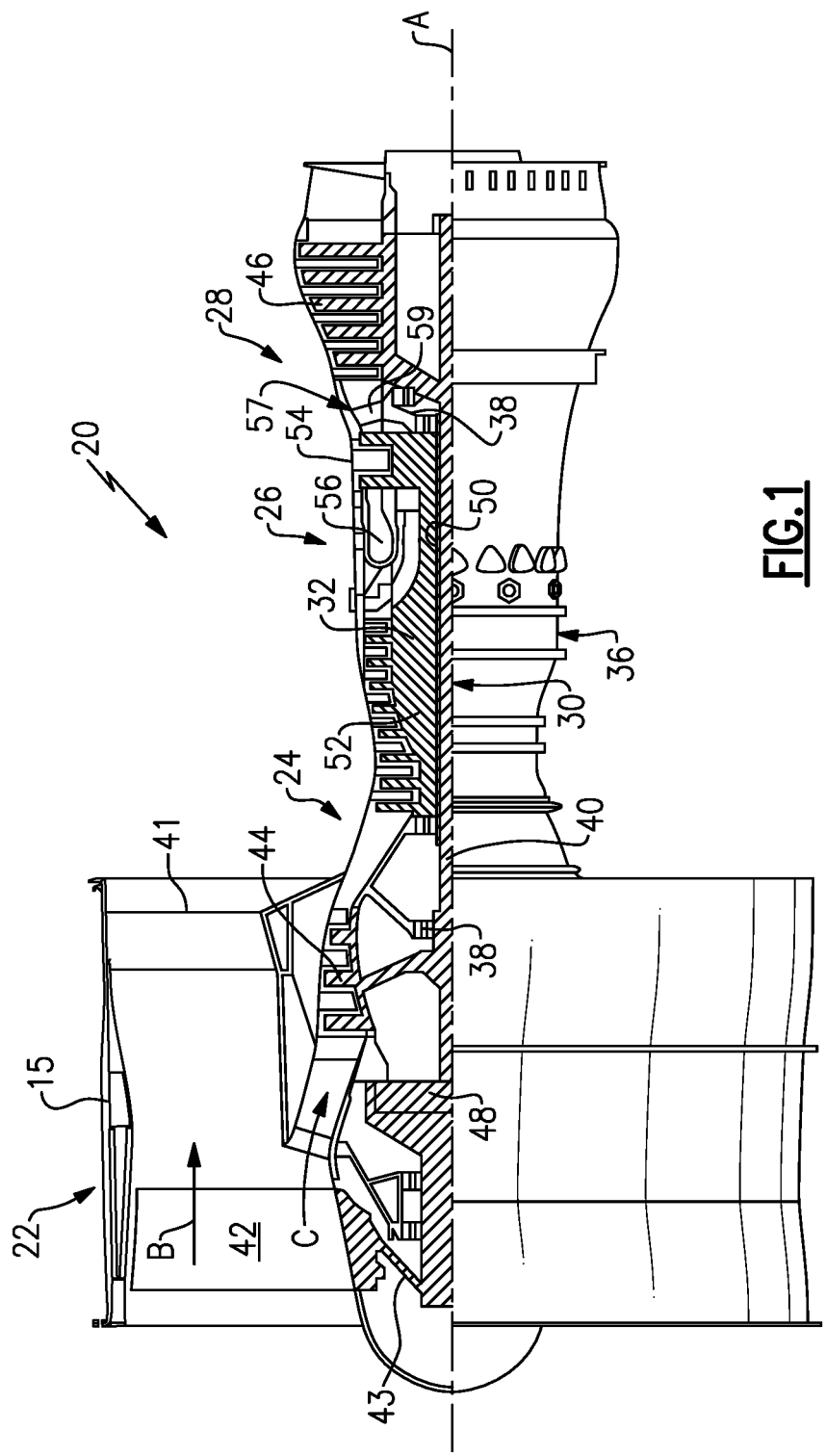
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
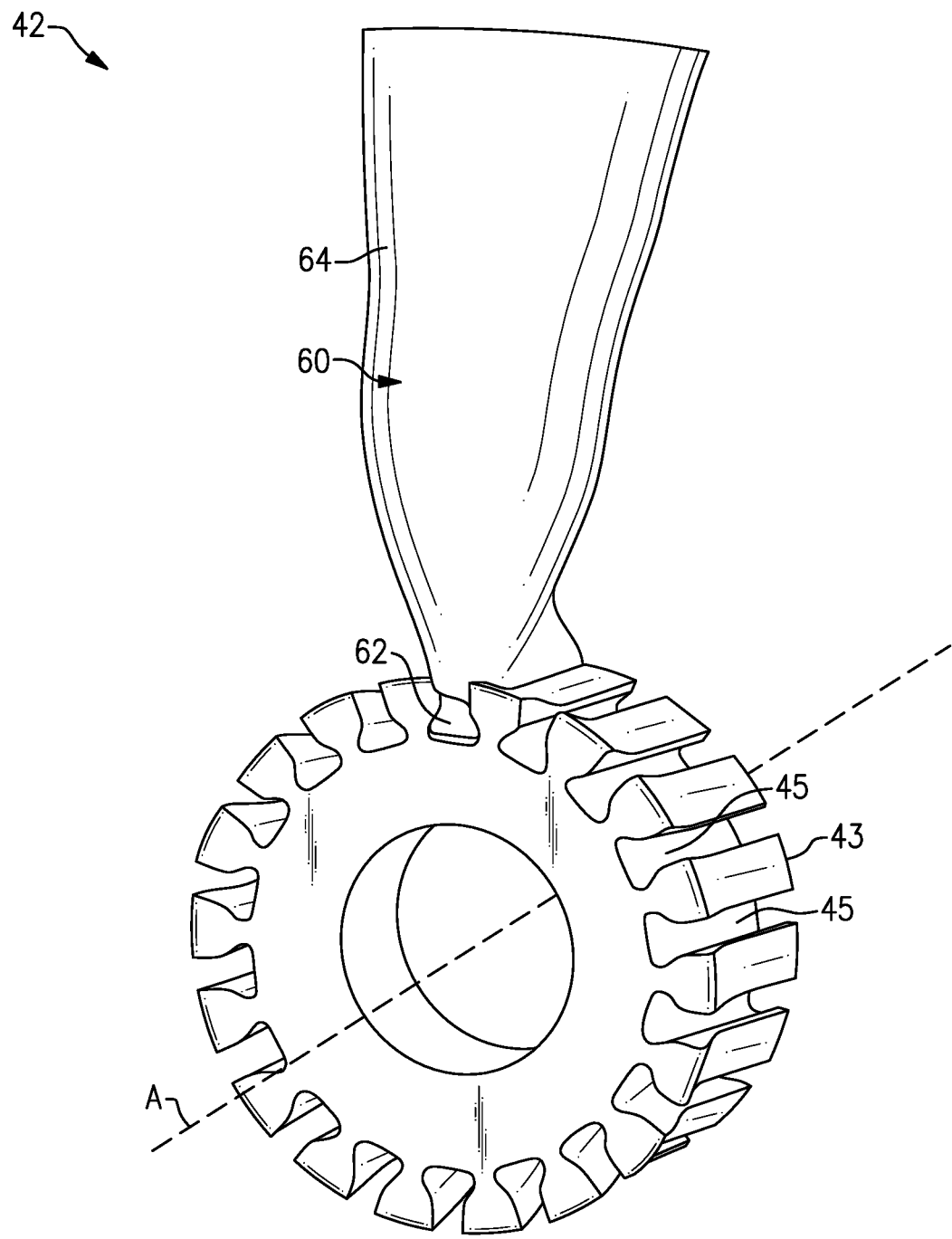
FIG. 2 illustrates a fan hub and an airfoil.

Referring to FIG. 2, the fan 42 includes a fan hub 43 that carries a plurality of fan blades or airfoils 60 (one shown for illustrative purposes) that are rotatable about the engine longitudinal axis A. The airfoil 60 includes a root section 62 and an airfoil section 64. The fan hub 43 defines a plurality of circumferentially spaced apart slots 45. The root section 62 of each airfoil 60 is dimensioned to be slideably received within a respective slot 45 to mount the airfoil 60 in the engine 10. The root section 62 can have a generally dovetail geometry that mates with walls of the slot 45.

Figure 3:
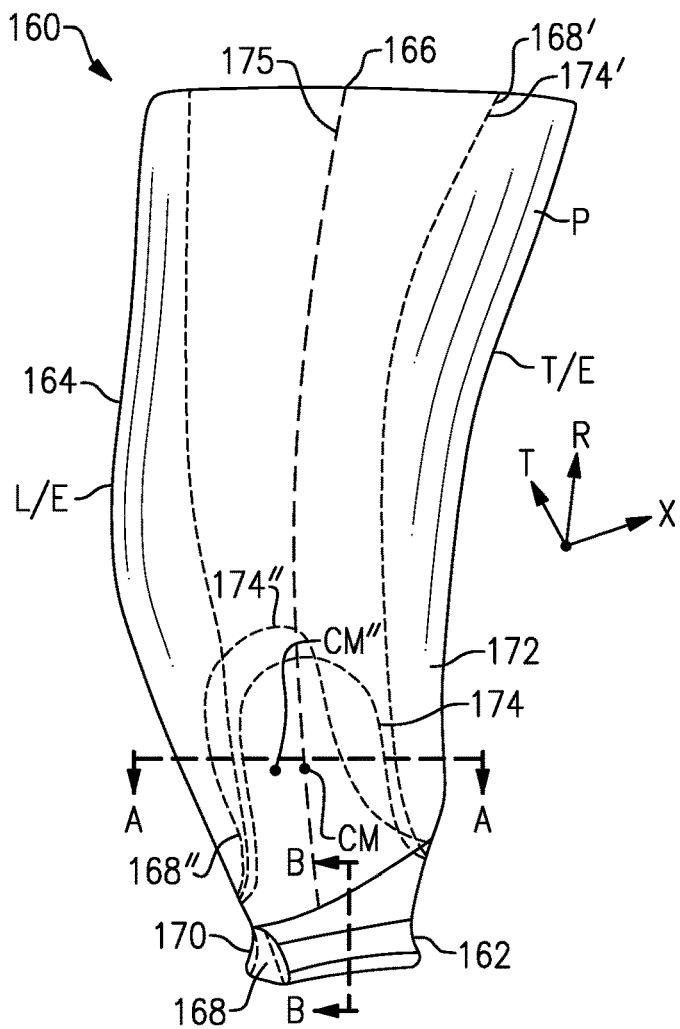
FIG. 3 is a perspective view of an airfoil.
Figure 4:
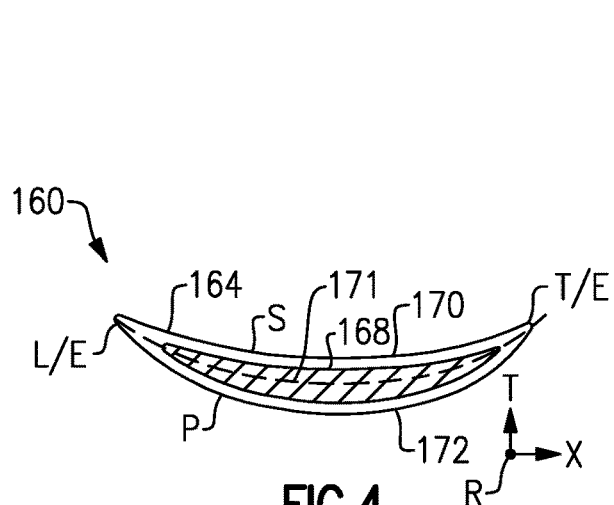
FIG. 4 is a sectional view of the airfoil along line A-A of FIG. 3.
Figure 5:
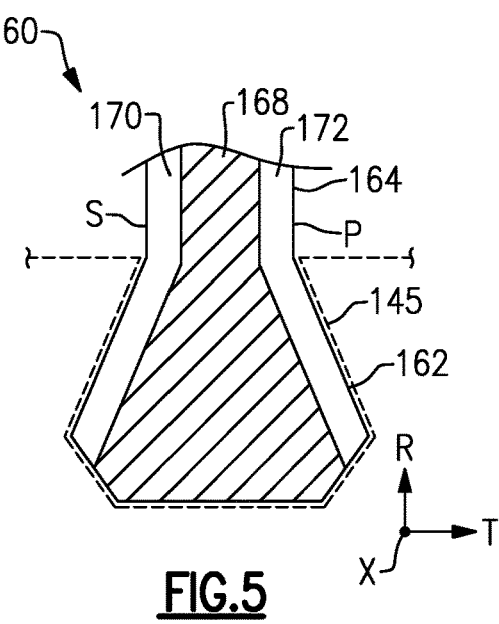
FIG. 5 is a sectional view of the airfoil along line B-B of FIG. 3.

FIGS. 3-5 illustrate an example composite airfoil 160. In this disclosure, like reference numerals designate like elements where appropriate and reference numerals with the addition of one-hundred or multiples thereof designate modified elements that are understood to incorporate the same features and benefits of the corresponding original elements. The airfoil 160 can be a fan blade incorporated into the fan 42 of FIGS. 1 and 2, for example. Other portions of the engine can benefit from the teachings herein, such as fan exit guide vanes 41 or airfoils in the compressor or turbine sections 24, 28 of FIG. 1. Other systems can also benefit from the teachings disclosed herein, including ground-based power generation systems.

The airfoil 160 includes a root section 162 and an airfoil section 164. The airfoil section 164 extends in a spanwise or radial direction R from the root section 162 to a tip 166. The tip 166 is a terminal end of the airfoil 160. The airfoil section 164 generally extends in a chordwise or axial direction X between a leading edge L/E and a trailing edge T/E. The airfoil section 164 defines a pressure side P and a suction side S separated in a thickness direction T. Generally, the airfoil section 164 provides an aerodynamic surface for guiding airflow to downstream portions of the engine in response to rotation of the airfoil 160. The root section 162 of the airfoil 160 is mounted to a rotor, such as the fan hub 43 of FIGS. 1 and 2.

Referring to FIG. 6, span positions of the airfoil section 164 are schematically illustrated from 0% to 100% span in 10% increments to define a plurality of sections 167. Each section 167 at a given span position is provided by a conical cut that corresponds to the shape of segments the bypass flowpath B or the core flow path C (FIG. 1), as shown by the large dashed lines. The 0% span position corresponds to the radially innermost location of the airfoil section 164 that meets the root section 162. A 100% span position corresponds to a section of the airfoil 160 at the tip 166.

Referring back to FIGS. 3-5, the airfoil 160 includes a composite core 168, a first skin 170 and a second skin 172. The core 168 defines the root section 162 and at least a portion of the airfoil section 164, with the core 168 terminating at an edge or boundary 174 (shown in dashed lines in FIG. 3). The core 168 can extend along a mean camber line 171 (shown in dashed lines in FIG. 4) that bisects a thickness of the airfoil 160 for at least some span positions of the airfoil section 164.

The core 168 can be dimensioned to provide increased rigidity to localized portions of the root and airfoil sections 162, 164. In the illustrated example of FIG. 3, the core 168 defines a portion of the airfoil section 164 such that the boundary 174 of the core 168 is spaced apart from the tip 166. In the illustrated example of FIG. 3, the airfoil section 164 is free of the core 168 for at least a majority of span positions of the airfoil section 164. In some examples, the boundary 174 of the core 168 terminates in the radial direction R along the airfoil section 164 prior to about 25% span, or more narrowly between about 5% span and about 20% span. For the purposes of this disclosure, the term "about" means ±3% of the respective quantity unless otherwise stated. In other examples, the core 168 defines a portion of the tip 166, as illustrated by boundary 174' (FIG. 3).

In some examples, core 168' is skewed toward the leading edge L/E of the airfoil 160, as illustrated by boundary 174" of FIG. 3. A reference plane 175 is established along the airfoil section 164 between 0% and 100% span. The reference plane 175 is equidistant between the leading and trailing edges L/E, T/E for each respective span position. Core 168" is situated such that a center of mass CM" of the core 168" is defined along the mean camber line 171 (FIG. 4) at a location between the leading edge L/E and the reference plane 175, whereas a center of mass CM of the core 168 may be situated along the reference plane 175, for example. Situating the core 168" relatively closer to the leading edge L/E can provide improved localized impact resistance, while skins 170, 172 can provide relatively greater in-plane strength and stiffness to regions adjacent to the trailing edge T/E, for example. Terminating the core 168 prior to the tip 166 can provide the airfoil 160 with better in-plane strength and stiffness in regions where the core 168 is not present, but may have less delamination resistance.

The skins 170, 172 extend along the core 168 to define external surfaces of the airfoil 160. In the illustrated example of FIGS. 3 and 5, the skins 170, 172 extend along opposed sides of the core 168 to define the root section 162. The root section 162 can define a dovetail geometry that interfaces with a respective slot 145 of a rotor (shown in dashed lines in FIG. 5). The skins 170, 172 extend along the dovetail geometry to space apart the core 168 from walls of the respective slot 145. The skins 170, 172 can be relatively more compliant than the core 168, and can provide improved absorption of impacts and load transfer between the airfoil 160 and the fan hub 43 (FIG. 2) during engine operation, which can improve durability of the airfoil 160. In alternative examples, the root section 162 is free of the skins 170, 172 such that the core 168 abuts the walls of the respective slot 145.

The skins 170, 172 extend along opposed sides of the core 168 for at least some span positions of the airfoil section 164 and join together to define the tip 166. The boundary 174 of the core 168 can be contoured or tapered to provide a relatively smooth interface between the skins 170, 172. The skins 170, 172 are joined together along the leading and trailing edges L/E, T/E and define the pressure and suction sides P, S. In some examples, the core 168 defines at least a portion of the leading and/or trailing edges L/E, T/E of the airfoil 160. In other examples, the core 168 is spaced apart from the leading and/or trailing edges L/E, T/E.

The core 168 and skins 170, 172 can be made of various composite materials to define the airfoil 160. The core 168 and skins 170, 172 can be constructed from fibers arranged in various orientations and in one or more layers based on structural requirements. In some examples, the core 168 and/or skins 170, 172 include carbon fibers. The core 168 and/or skins 170, 172 can be constructed from other materials, including fiberglass, an aramid such as Kevlar®, a ceramic such as Nextel™, and a polyethylene such as Spectra®.

Figure 7A:
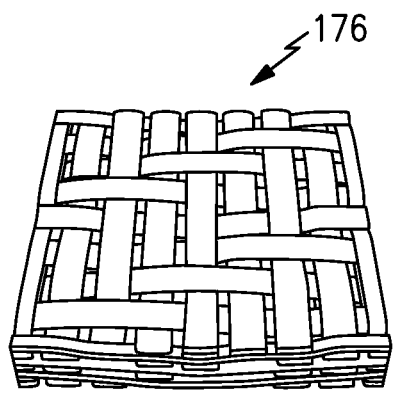
FIG. 7A illustrates a three-dimensional network of fibers.
Figure 7B:
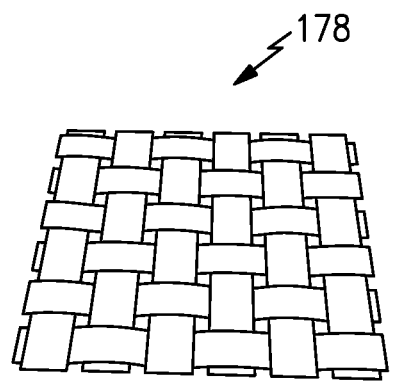
FIG. 7B illustrates a two-dimensional network of fibers.

In the illustrated example of FIGS. 3-5, the core 168 includes and is constructed from a three-dimensional network of fibers 176 (FIG. 7A), which can be woven or interlaced. The three-dimensional network of fibers 176 can be formed from a dry fiber preform, for example. Each of the skins 170, 172 can be a composite skin that includes and is constructed from a two-dimensional network of fibers 178 (FIG. 7B), which can be woven or interlaced.

The two-dimensional network of fibers 178 can be formed from a pre-impregnated ("prepreg") fabric or a pre-impregnated tape, for example. Pre-impregnating the fibers with resin can provide relatively greater strength and toughness to the composite article. Matrix (resin) materials used for prepreg can have greater toughness compared to matrix materials used with resin infusion methods, such that a part made from prepreg is relatively stronger, as measured by delamination resistance.

Figure 7C:
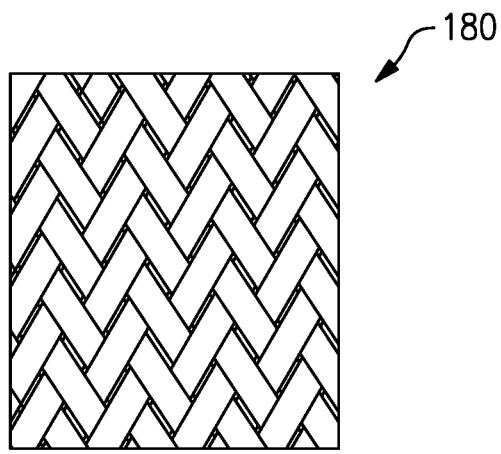
FIG. 7C illustrates a network of braided yarns.
Figure 7D:
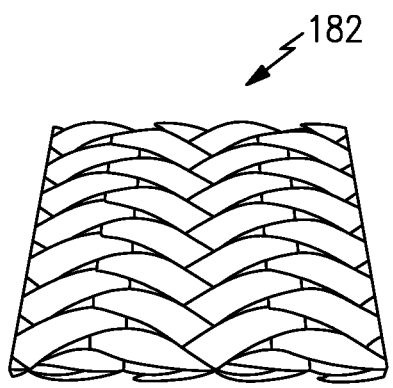
FIG. 7D illustrates a tri-axial braided network of fibers.

In other examples, the skins 170, 172 include a plurality of relatively thin uni-tape plies having a plurality of fibers oriented in the same direction. In some examples, the core 168 and/or skins 170, 172 can include a network of biaxial braids 180 (FIG. 7C). Other configurations for the core 168 and/or skins 170, 172 can include a network of tri-axial braids 182 (FIG. 7D), for example. In other examples, the skins 170, 172 include a network of stitched or non-crimped fabrics. The example fiber constructions are known in the art, but the incorporation of the fiber constructions into airfoil 160 to define the core 168 and skins 170, 172 utilizing the teachings herein are not known.

The core 168 and/or skins 170, 172 can include different fiber types in the fiber directions to tailor the strength and stiffness of the core 168 and/or skins 170, 172. For example, high modulus carbon fibers may be used in conjunction with low modulus carbon fibers. In yet another example, fiberglass or aramid fibers may be used in combination with carbon fibers.

Incorporating a three-dimensional network of fibers into the core 168, including the three-dimensional network of woven or interlaced fibers 176 (FIG. 7A), provides reinforcement in localized portions of the airfoil 160 that may be more susceptible to degradation due to impact from foreign objects. Incorporating a two-dimensional network of fibers into the skins 170, 172, including the two-dimensional network of fibers 178 (FIG. 7B), can provide relatively greater in-plane strength and stiffness to other portions of the airfoil 160.

Figure 8:
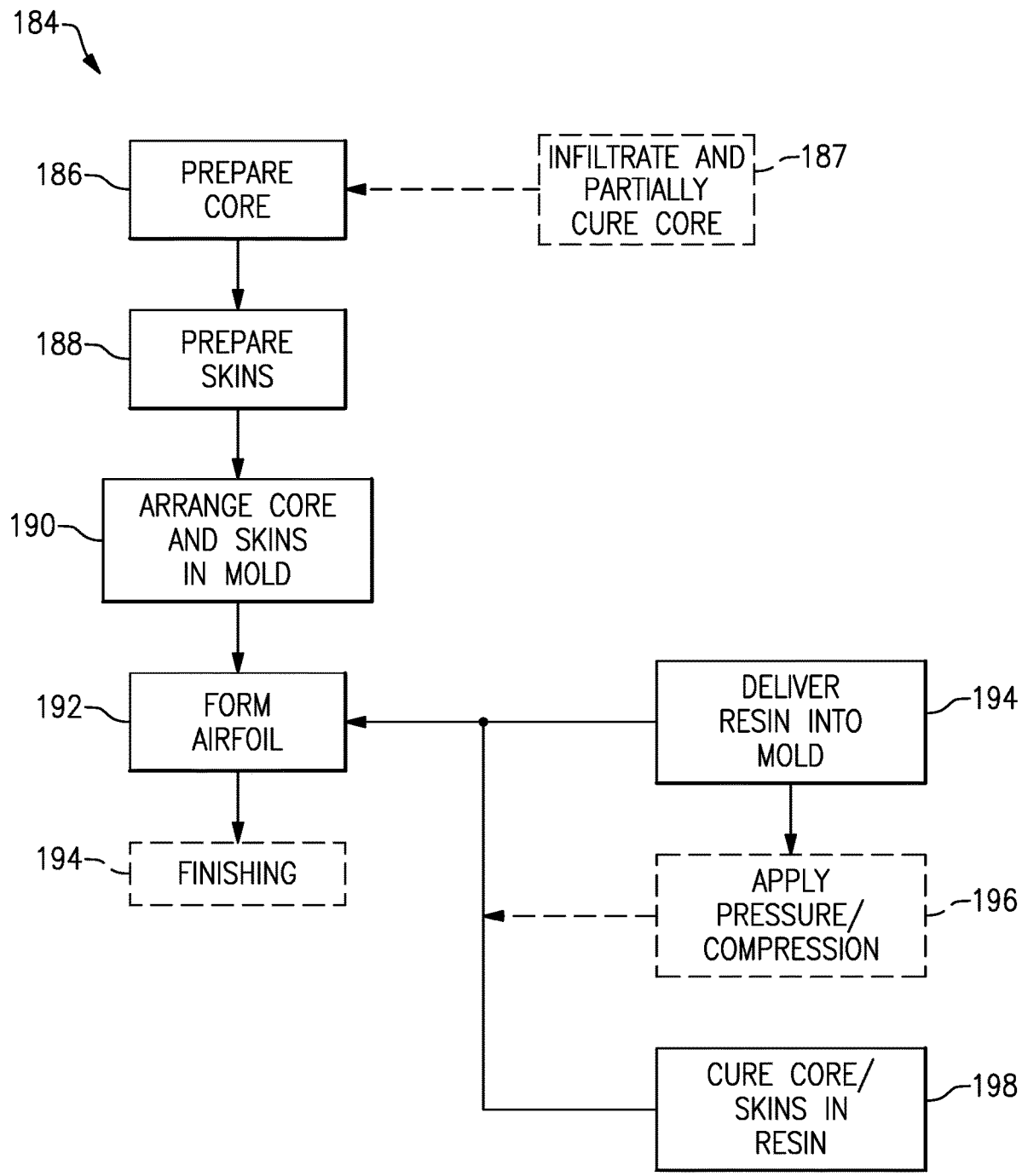
FIG. 8 is an example method in a flow chart of forming a composite airfoil.

Various techniques can be utilized to form a composite article for a gas turbine engine such as the airfoil 160. FIG. 8 illustrates an example process in a flow chart 184 for forming a composite article or airfoil, such as airfoil 160. Reference is made to airfoil 160 for illustrative purposes. The techniques disclosed herein can improve structural properties of the airfoil 160, which can improve durability, and can reduce manufacturing cost.

At step 186, a core 168 is fabricated or otherwise prepared. The core 168 can be fabricated from a dry fiber preform to form or otherwise define a three-dimensional network of woven fibers. The core 168 may be fabricated on a loom using a weaving process, for example. A tackifier can be applied to the preform to prepare the core 168. The core 168 can be dimensioned according to expected stresses or impacts that may be observed during use of the composite article.

At step 188, first and second skins 170, 172 are fabricated or otherwise prepared. The skins 170, 172 can be prepared from a pre-impregnated fabric or pre-impregnated tape to form or otherwise define a two-dimensional network of fibers.

The core 168 and skins 170, 172 can be arranged to establish a layup. The layup can be formed on a tool. Steps 186 and/or 188 can be performed by an automated fiber placement (AFP) process, or the steps can be performed manually by hand placement of a three-dimensional woven core and hand placing of prepreg plies to form the skins. AFP is generally known, and includes placement of narrow strips of unidirectional material or "tows" to build up the composite layers that constitute the article according to a predefined geometry. Forming the three-dimensional woven core 168 using the techniques disclosed herein can eliminate the need to form relatively small plies or layers that may otherwise be needed to fill a volume of the airfoil to define the airfoil geometry but that may not be practical to use in an AFP process.

At step 190, the skins 170, 172 are assembled or otherwise arranged relative to the core 168 in a mold. Surfaces of the mold can be dimensioned according to an external profile or contour of the airfoil 160. In some examples, step 186 includes partially curing the core 168 at step 187 prior to step 190 and prior to positioning the core 168 in the mold, which may be referred to as a "b-staged" core. Step 187 can include infiltrating the core 168 with a resin that is chemically compatible with a resin used for subsequent injection. Once infiltration occurs, the core 168 is partially cured or "b-staged". As known, prepreg is already b-staged.

Steps 186, 188 and/or 190 can be performed such that the airfoil section 164 is free of the core 168 for at least a majority of span positions of the airfoil section 164, including the core 168 terminating at any of the span positions disclosed herein.

At step 192, a composite airfoil such as airfoil 160 is formed. Step 192 can include forming the core 168 and the skins 170, 172 together with resin in the mold to define the airfoil 160, and such that the core 168 defines the root section 162 of the airfoil 160 and the skins 170, 172 extend at least partially along the core 168 to define at least a portion of the root section 162 and the airfoil section 164 of the airfoil 160. Resin materials can include a thermoset epoxy, for example, and can infuse the dry fiber preform.

The process 184, including step 192, can be performed using a closed-molding process. For example, step 192 can be performed using a resin transfer molding (RTM) process or a resin pressure molding (RPM) process to define the airfoil 160 including forming the core 168 and skins 170, 172 together to define the root and airfoil sections 162, 164.

Resin transfer molding (RTM) is generally known for manufacturing composite articles. RTM is a closed-molding process that typically includes fabricating a fiber preform by laying up plies of fiber sheets in a stack, placing the fiber preform in a closed mold, and then saturating the fiber preform with a liquid thermoset resin. The resin is typically mixed with a catalyst or hardener prior to being injected into the closed mold, or can be previously mixed together in a one-part resin system. One-part resin systems already have the catalyst mixed with the resin. The article is heated in the mold to a desired temperature to cure the article. The mold can be heated using a liquid heating system, for example. In some examples, the mold is heated by direct contact with heated platens such as in a compression press or free-standing in an oven. A variation of RTM is vacuum-assisted resin transfer molding (VARTM). In a VARTM process, a vacuum is used to draw the resin into the mold. The RTM process generally results in a part with a slightly lower volume percentage of fiber compared to a part made from prepreg and processed in an autoclave.

Resin pressure molding (RPM) is generally known for manufacturing composite articles. RPM can be considered a variation of an RTM process. RPM is a closed-molding process which includes delivering a liquid resin into a closed mold in which some, or all, of the fiber reinforcement has been pre-impregnated with a resin. Thereafter and similar to RTM, a combination of elevated heat and hydrostatic resin pressure are applied to the mold to cure the article.

Step 192 can include curing the core 168 and skins 170, 172 in the resin at step 198. Step 198 can occur subsequent to injecting or otherwise delivering the resin into the mold. Step 192 can include heating the mold to a predetermined temperature for a set period of time to at least partially or fully cure the core 168 and skins 170, 172. One would understand how to determine the temperature and time period to cure the core 168 and skins 170, 172 utilizing the teachings herein. Step 192 can include applying resin pressure concurrently with heat to the core 168, skins 170, 172 and resin at step 196, such as during an RTM or RPM process. The RPM process can include utilization of a b-staged core 168 and prepreg skins 170, 172, or a dry fiber core 168 and prepreg skins 170, 172, for example. Forming the airfoil 160 with an RPM process can close any gaps in the composite article and can yield relatively better dimensional control of the cured article. This technique can eliminate separate injection and curing steps for the core 168.

Pre-impregnated fabric or tape can provide the ability to use resin systems with a higher toughness and impact resistance as compared to resin that may be used in a transfer molding (RTM) process to infuse the dry fiber tape. The dry fiber preform used to form the core 168 is infused with resin, but the relatively lower toughness resin that may used in the RTM process is adequate since the three-dimensional network of fibers used to form the core 168 can provide relatively greater toughness and impact resistance. In other examples, the skins 170, 172 including a two-dimensional network of fibers is formed from a dry fiber tape. A binder material can be added to the dry fiber tape to hold the layers of the fiber tape together and promote adhesion.

One or more finishing procedures can be performed on the cured composite article defining the airfoil 160 at step 194. Example finishing procedures can include one or more grinding operations to remove excess material at parting lines caused by the molding process, or final dimensioning of the airfoil 160 geometry.

In alternative examples, the core 168 is staged on a tool. The core 168 is integrated with the skins 170, 172. The core 168 and skins 170, 172 are then cured together in an autoclave.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil section extending between a leading edge and a trailing edge in a chordwise direction and extending between a tip and a root section in a spanwise direction, the airfoil section defining a suction side and a pressure side separated in a thickness direction;
wherein a composite core defines the root section and a portion of the airfoil section such that the composite core is spaced apart from the tip, and the composite core includes a three-dimensional network of woven fibers;
wherein first and second skins extend along opposed sides of the composite core for at least some span positions of the airfoil section and join together to define the tip, and each of the first and second skins is a composite skin including a two-dimensional network of woven fibers; and
wherein the airfoil section is free of the core for at least a majority of span positions of the airfoil section.

2. The airfoil as recited in claim 1, wherein the three-dimensional network of woven fibers is formed from a dry fiber preform.

3. The airfoil as recited in claim 2, wherein the composite core and the first and second skins are formed together by resin transfer molding or by resin pressure molding to define the airfoil section and the root section.

4. The airfoil as recited in claim 3, wherein the two-dimensional network of fibers is formed from a pre-impregnated fabric or a pre-impregnated tape.

5. The airfoil as recited in claim 4, wherein the composite core terminates in the spanwise direction along the airfoil section prior to about 25% span.

6. The airfoil as recited in claim 5, wherein the core is skewed toward the leading edge.

7. The airfoil as recited in claim 6, wherein a center of mass of the composite core is between the leading edge and a reference plane, and the reference plane is defined as a plane equidistant between the leading edge and the trailing edge for each span position of the airfoil section.

8. The airfoil as recited in claim 7, wherein the center of mass is along a mean camber line bisecting the airfoil section in the thickness direction.

9. The airfoil as recited in claim 1, wherein the first and second skins are joined at both the leading edge and the trailing edge.

10. The airfoil as recited in claim 9, wherein the composite core extends between the leading edge and trailing edge at a first span position inward of a second span position relative to the spanwise direction, and wherein the first and second skins are joined together at the leading edge and the trailing edge at the second span position.

11. A gas turbine engine comprising:
a fan section including a fan hub that carries a plurality of fan blades, the fan hub rotatable about an engine longitudinal axis;
a compressor section;
a turbine section that drives the compressor section and the fan section; and
wherein each of the plurality of fan blades comprises:
a root section received in a respective slot defined by the fan hub; and
an airfoil section extending between a leading edge and a trailing edge in a chordwise direction and extending between a tip and the root section in a spanwise direction, the airfoil section defining a suction side and a pressure side separated in a thickness direction;
wherein a composite core defines the root section and a portion of the airfoil section such that the composite core is spaced apart from the tip;

wherein first and second skins extend along opposed sides of the composite core for at least some span positions of the airfoil section and join together to define the tip, and each of the first and second skins is a composite skin including a two-dimensional network of woven fibers; and wherein the airfoil section is free of the core for at least a majority of span positions of the airfoil section.

12. The gas turbine engine as recited in claim 11, wherein the composite core includes a three-dimensional network of woven fibers formed from a dry fiber preform, the two-dimensional network of fibers is formed from a pre-impregnated fabric or a pre-impregnated tape, and the composite core and the first and second skins are formed together by resin pressure molding or by resin transfer molding to define the airfoil section and the root section.

13. The gas turbine engine as recited in claim 12, wherein the core terminates in the spanwise direction along the airfoil section prior to about 25% span.

14. The gas turbine engine as recited in claim 13, wherein the root section defines a dovetail geometry that interfaces with the respective slot, and the first and second skins extend along the dovetail geometry to space apart the core from walls of the respective slot.

15. The gas turbine engine as recited in claim 11, wherein a center of mass of the composite core is between the leading edge and a reference plane, and the reference plane is defined as a plane equidistant between the leading edge and the trailing edge for each span position of the airfoil section.

16. The airfoil as recited in claim 15, wherein the composite core and the first and second composite skins include a network of woven fibers.

17. The airfoil as recited in claim 15, wherein the center of mass is along a mean camber line bisecting the airfoil section in the thickness direction.

18. The airfoil as recited in claim 15, wherein the first and second skins are joined at both the leading edge and the trailing edge.

19. The airfoil as recited in claim 18, wherein the composite core extends between the leading edge and trailing edge at a first span position inward of a second span position relative to the spanwise direction, and wherein the first and second skins are joined together at the leading edge and the trailing edge at the second span position.

20. An airfoil for a gas turbine engine comprising:
an airfoil section extending between a leading edge and a trailing edge in a chordwise direction and extending between a tip and a root section in a spanwise direction, the airfoil section defining a suction side and a pressure side separated in a thickness direction;
wherein a composite core defines the root section and a portion of the airfoil section such that the composite core is spaced apart from the tip;
wherein first and second composite skins extend along opposed sides of the composite core for at least some span positions of the airfoil section and join together to define the tip; and
wherein the composite core terminates in the spanwise direction along the airfoil section prior to about 25% span and includes a center of mass between the leading edge and a reference plane, and the reference plane is defined as a plane equidistant between the leading edge and the trailing edge for each span position of the airfoil section.

* * * * *